United States Patent [19]

Trezeguet et al.

[11] 4,422,889
[45] Dec. 27, 1983

[54] METHOD OF MANUFACTURING AN OPTICAL FIBRE CABLE

[75] Inventors: Jean-Pierre Trezeguet; Jean-Patrick Vives, both of Calais, France

[73] Assignee: Les Cables De Lyon, Clichy, France

[21] Appl. No.: 322,128

[22] Filed: Nov. 17, 1981

[30] Foreign Application Priority Data

Nov. 20, 1980 [FR] France .................. 80 24628

[51] Int. Cl.³ .................. B32B 3/00; B65H 5/00; G02B 5/16
[52] U.S. Cl. .................. 156/70; 156/172; 156/48; 156/145; 350/96.23; 350/96.31; 350/320
[58] Field of Search .......... 156/142, 143, 169, 172, 156/180, 328, 70, 149, 298, 145, 303.1, 48, 293, 306.6, 171, 296; 358/901; 264/1.1, 1.5; 350/96.23, 96.31, 96.3, 319, 320, 318

[56] References Cited

U.S. PATENT DOCUMENTS

| | | | |
|---|---|---|---|
| 2,516,864 | 8/1950 | Gilmore et al. | 156/143 |
| 3,144,072 | 8/1964 | Karbowiak | 156/143 |
| 4,116,739 | 9/1978 | Glenn | 156/169 |
| 4,205,899 | 6/1980 | King et al. | 350/96.23 |
| 4,241,979 | 12/1980 | Gagen et al. | 350/96.23 |
| 4,272,472 | 1/1981 | Hulin et al. | 264/146 |

FOREIGN PATENT DOCUMENTS

| | | |
|---|---|---|
| 2358666 | 2/1978 | France . |
| 1590767 | 6/1981 | United Kingdom . |
| 2082790 | 3/1982 | United Kingdom .......... 350/96.23 |

OTHER PUBLICATIONS

Miller, Tactical Low Loss Optical Fiber Cable for Army Applic., Dec. 1974, pp. 266-275, Proc. of Int. Wire and Cable Symp.
IBM Technical Disclosure Bulletin, vol. 20, No. 1, Jun. 1977-Lean et al.
Handbook of Adhesives 2nd Ed. ©1977; Skeist pp. 255-259, pp. 692-695.

*Primary Examiner*—David A. Simmons
*Assistant Examiner*—Louis Falasco
*Attorney, Agent, or Firm*—Sughrue, Mion, Zinn, Macpeak and Seas

[57] ABSTRACT

An optical fibre cable includes a generally cylindrical elongate central support structure with helical grooves formed around its periphery. The grooves (2) are partially filled with the compound (3) which is viscous at cable operation temperature. Said support structure (1) is then cooled to reversibly harden said compound (3). Optical fibres (4) are then layed in the grooves over the compound in its hard state. Lastly the grooves are topped up with viscous compound.

2 Claims, 4 Drawing Figures

FIG.1
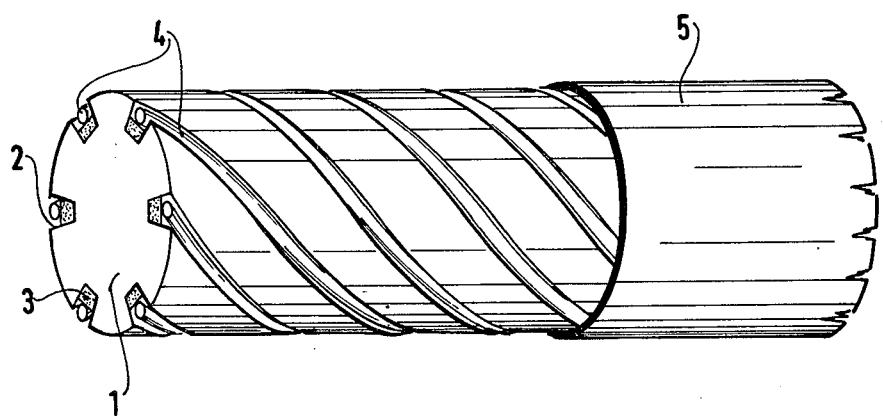
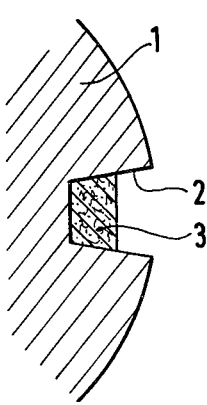
FIG.2A
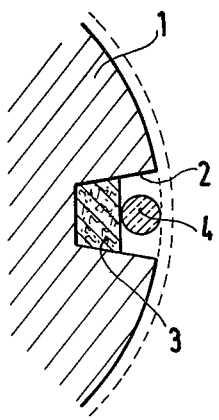
FIG.2B
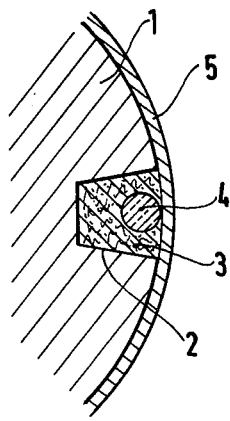
FIG.2C

METHOD OF MANUFACTURING AN OPTICAL FIBRE CABLE

The present invention relates to optical fibre cables.

BACKGROUND OF THE INVENTION

In such cables, the optical fibres are associated with a generally cylindrical elongate support structure which bears tractive forces. The support structure is generally made of metal or of a plastics substance such as polyethylene which may optionally be reinforced with a central steel wire. The support structure has helical grooves around its periphery, which may be of constant-pitch or of periodically-reversing pitch and the fibres are deposited in the grooves.

The cross-section of the grooves is larger than that of the fibres to allow them the possibility of some play and they are closed by a casing or tape which covers the support structure, the space left free in the grooves being filled with a viscous compound. These grooves serve to even out the stresses exerted on the fibres during the fibre winding operations, and during use of the resulting cable.

The assembly formed by the support structure and by the optical fibres is covered with an outer sheath, possibly with mechanical reinforcement and, if need be, with one or more intermediate layers of substance which acts as a shock absorber and of strong wire which acts as a protection against radial compression forces.

The mobility of the fibres in the grooves is satisfactory for bending stresses but not satisfactory for tractive stresses which elongate the support structure, in particular when these stresses are close to the breaking point of the support structure or when they are due to large amplitude thermal cycling.

Preferred embodiments of the present invention provide optical fibres whose length is sufficiently longer than that of the support structure for the tractive forces not to be transmitted to them as long as the support structure does not reach its breaking elongation limit.

SUMMARY OF THE INVENTION

The present invention provides a method of manufacturing an optical fibre cable comprising a generally cylindrical elongate central support structure with helical grooves formed around its periphery to accommodate optical fibres, wherein the method comprises the steps of:

filling the bottoms of the grooves with a compound which is viscous at cable operation temperature;

cooling said support structure to reversibly harden said compound in the bottoms of the grooves, laying the optical fibres in the grooves over the compound while the compound is maintained at a temperature below its hardening temperature; and topping off the grooves with viscous compound at a temperature above its hardening temperature.

BRIEF DESCRIPTION OF THE DRAWINGS

An embodiment of the invention is described with reference to the accompanying drawing in which:

FIG. 1 illustrates the support structure on which the fibres are laid in accordance with the method of the invention; and FIG. 2 illustrates successive steps A, B and C of the method of manufacturing an optical fibre cable in accordance with the invention.

MORE DETAILED DESCRIPTION

In FIG. 1, the support structure in which the fibres are to be accommodated is referenced 1. It is preferably made of metal or of a plastics substance, e.g. aluminium or polyethylene and it may be reinforced by a central steel wire, not illustrated. Its outside diameter is 6 mm.

This support structure 1 has helical grooves 2 around its periphery; here, these grooves have a constant pitch; in a variant, they could alternatively have a pitch that is reversed periodically. Advantageously, grooves for sheathed fibres 0.25 mm in diameter are 1.7 mm deep.

As also illustrated at A in FIG. 2, the bottoms of the grooves 2 are filled with a compound 3 which is viscous at the temperatures at which the cable is used, e.g. polyisobutylene or polybutene brought to a temperature of 60° to 80° C. Before the fibres are deposited in the thus partially filled grooves, the viscous compound deposited in the support structure is cooled to ambient temperature to reversibly harden the compound 3 in the bottoms of the grooves and the assembly is kept below the hardening temperature of the compound so that it remains hard while the fibres are being laid in the grooves on the support structure.

The fibres 4 are deposited in the grooves on top of the hardened compound, this step being schematically illustrated at B in FIG. 2.

After the fibres are laid around the support structure, the grooves are topped up with compound in the viscous state and so as to completely fill the grooves. The support structure with its filled-in grooves is then covered with a sheath or with two layers of helically wound copper or polyethylene tape 5, thereby retaining the fibres in the grooves as illustrated at C in FIG. 2.

The support structure on which the fibres are installed and held in the then completely filled grooves is brought to the storage or the operation temperature of the cable (60° to 80° C.). These temperatures return the compound 3 to its viscous state, but the fibres remain at the level they occupied when they were originally laid in the grooves unless there is a strain differential between the optical fibres and the support.

When the storage or operation temperature of the cables are lower, for instance about room temperature, the grooves are partly filled with a compound of a softening temperature near room temperature, and the cable is thereafter cooled under room temperature in order to harden the compound before the optical fibres are deposited onto the grooves.

By partially filling the grooves and by cooling the compound, the grooves are temporarily filled in to an intermediate depth before fibre-laying operation. It is the fact of laying the fibres at the intermediate depth, which makes it possible for the support to stretch relative to the fibres when required. The fibres then simply sink deeper into the grooves.

We claim:

1. A method of manufacturing an optical fibre cable comprising the steps of:

filling helical grooves formed about the periphery of a generally cylindrical elongate central support structure with a compound which is viscous at cable operation temperature to an intermediate level while in a viscous state;

cooling said support structure and said viscous compound to reversibly harden said compound partially filling said grooves;

laying optical fibres in said grooves over said hardened compound while said compound is maintained at a temperature below its hardening temperature to locate said fibres at the intermediate depth; and filling the balance of the grooves with the said viscous compound at a temperature above its hardening temperature; and covering said support structure with its filled-in grooves with a sheet to retain the fibres in the grooves at their intermediate depth position such that, when at higher operation temperatures the compound returns to its viscous state with the fibres remaining at the level they occupied as originally laid in the grooves, unless there is a strain differential between the optical fibres and the support to permit the fibers to sink deeper within the grooves to satisfy tractive stresses which elongate the support structure.

2. A method according to claim 1, wherein the bottoms of the grooves are filled with one material from the group consisting of polyisobutylene and polybutene brought to a temperature between 60° and 80° C. and then cooled to ambient temperature to harden it.

* * * * *